US008875041B1

(12) United States Patent
Desai et al.

(10) Patent No.: US 8,875,041 B1
(45) Date of Patent: Oct. 28, 2014

(54) METHODS AND SYSTEMS FOR PROVIDING FEEDBACK ON AN INTERFACE CONTROLLING A ROBOTIC DEVICE (75) Inventors: Munjal Desai, Mountain View, CA (US); Ryan Hickman, Mountain View, CA (US); Thor Lewis, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 568 days.

(21) Appl. No.: 13/213,731

(22) Filed: Aug. 19, 2011

(51) Int. Cl.
*G06F 3/048* (2013.01)
*G06F 3/0481* (2013.01)

(52) U.S. Cl.
CPC .......... *G06F 3/04812* (2013.01); *G06F 3/0481* (2013.01)
USPC .......................................... 715/771

(58) Field of Classification Search
CPC ..... G06F 8/34; G06F 3/0481; G06F 3/04847; G05B 19/0426; G05B 2219/23258
USPC ............... 715/771, 834; 463/36–37
See application file for complete search history.

(56) References Cited

U.S. PATENT DOCUMENTS

| 8,015,507 B2* | 9/2011 | Madsen et al. ................. 715/824 |
| 2010/0084513 A1* | 4/2010 | Gariepy et al. ................. 244/190 |
| 2011/0109449 A1* | 5/2011 | Riegelman et al. ............ 340/441 |

* cited by examiner

Primary Examiner — Amy Ng
Assistant Examiner — Roland Casillas
(74) Attorney, Agent, or Firm — McDonnell, Boehnen, Hulbert & Berghoff LLP (57) ABSTRACT Methods and systems for providing feedback on an interface for controlling a robotic device are provided. An example method includes receiving an input on an interface of a device within an area on a display of the interface. The input may indicate an orientation command and a velocity command for a robotic device. The method may further include providing a display of direction indicators on the interface representing a location of the input based on the location of the input. A location of the direction indicators may represent a direction associated with the orientation command. The method may also include providing a display of a geometric shape within the area on the display representing the location of the input, such that a size of the geometric shape corresponds to a magnitude of velocity associated with the velocity command. In this manner, visual feedback may be provided while receiving the input.

22 Claims, 8 Drawing Sheets

METHODS AND SYSTEMS FOR PROVIDING FEEDBACK ON AN INTERFACE CONTROLLING A ROBOTIC DEVICE

FIELD

This disclosure may relate to robotics, and in examples, to interfaces for controlling a robotic device.

BACKGROUND

In industrial design, a user interface provides functionality to enable interaction between humans and machines. A goal of interaction between a human and a machine at the user interface is generally effective operation and control of the machine, and feedback from the machine that aids the user in making operational decisions. Examples of user interfaces include interactive aspects of computer operating systems, hand tools, heavy machinery operator controls, process controls, etc.

Design considerations applicable when creating user interfaces may be related to or involve ergonomics and psychology. For example, user interfaces can be designed so as to be associated with the functionalities of a product, such as to enable intended uses of the product by users with efficiency, effectiveness, and satisfaction, taking into account requirements from context of use.

A user interface includes hardware and software components. User interfaces exist for various systems, and provide a manner to receive inputs allowing users to manipulate a system, and/or receive outputs allowing the system to indicate effects of the users' manipulation. Many types of user interfaces exist. One example user interface includes a graphical user interface (GUI) that is configured to accept inputs via devices such as a computer keyboard and mouse and provide graphical outputs on a display. Another example user interface includes touchscreens that include displays that accept input by touch of fingers or a stylus.

SUMMARY

This disclosure may disclose, inter alia, systems and methods for providing feedback on an interface controlling a robotic device.

In one example, a method is provided that comprises receiving an input indicating an orientation command and a velocity command for a robotic device, and providing a display of one or more direction indicators on an interface. A location of the one or more direction indicators on the interface may represent a direction associated with the orientation command. Additionally, the method may include providing a display of a geometric shape on the interface. A size of the geometric shape may correspond to a magnitude of velocity associated with the velocity command.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In another example, a non-transitory computer-readable medium having stored thereon instructions executable by a computing device to cause the computing device perform functions is provided. The functions may comprise receiving an input indicating an orientation command and a velocity command for a robotic device, and providing a display of one or more direction indicators on an interface. A location of the one or more direction indicators on the interface may represent a direction associated with the orientation command. Additionally, the functions may include providing a display of a geometric shape on the interface. A size of the geometric shape may correspond to a magnitude of velocity associated with the velocity command.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In another example, a device is provided that comprises a processor and memory including instructions stored therein executable by the processor to perform functions. The functions may comprise receiving an input indicating an orientation command and a velocity command for a robotic device, and providing a display of one or more direction indicators on an interface. A location of the one or more direction indicators on the interface may represent a direction associated with the orientation command. Additionally, the functions may include providing a display of a geometric shape on the interface. A size of the geometric shape may correspond to a magnitude of velocity associated with the velocity command.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for providing feedback on an interface controlling a robotic device. An example method includes receiving an input on an interface of a device within an area on a display of the interface. The input may indicate an orientation command and/or a velocity command for the robotic device, such as indicating to turn right/left, go forward/backward, with a given velocity, etc.

The method may also include providing a display of one or more direction indicators on the interface based on a location of the input. The display of the one or more direction indicators may represent the location of the input. A location of the one or more direction indicators on the interface may represent a direction associated with the orientation command. For example, a fixed number of direction indicators may be provided at fixed positions adjacent to a perimeter of the area on the display. Transparency values associated with the fixed number of direction indicators may vary based on distances from the location of the input to locations of the fixed number of direction indicators or an orientation of the location of the input with respect to a coordinate system of the area on the display. Thus, the display of the direction indicators may represent the location of the input.

Additionally, the method may include providing a display of a geometric shape within the area on the display representing the location of the input. A size of the geometric shape may correspond to a magnitude of velocity associated with the velocity command. For example, the size of the geometric shape may be directly proportional to the magnitude of velocity as indicated by the received input. In a further example, a perimeter of the geometric shape may be substantially adjacent a location of the input.

In another example, a modified portion of the geometric shape may represent the location of the input. The modified portion of the geometric shape may be provided opposite the location of the one or more direction indicators, providing a display representing the direction associated with the orientation command in an inverse manner. For example, the received input may be in an upper portion of the area on the display, indicating an orientation command to move forward. A display of two direction indicators may be provided near an upper perimeter of the area on the display. The geometric shape may be concentric with the area of the display, and a lower portion of the geometric shape, with a location on a lower portion of the area on the display, may be transparent. In one example, the geometric shape may be a circle, and a circular sector may be transparent, so as to appear as a portion missing from the circle. The circular sector may be opposite the direction associated with the orientation command. Thus, the modified portion may represent the location of the input indirectly.

Figure 1:
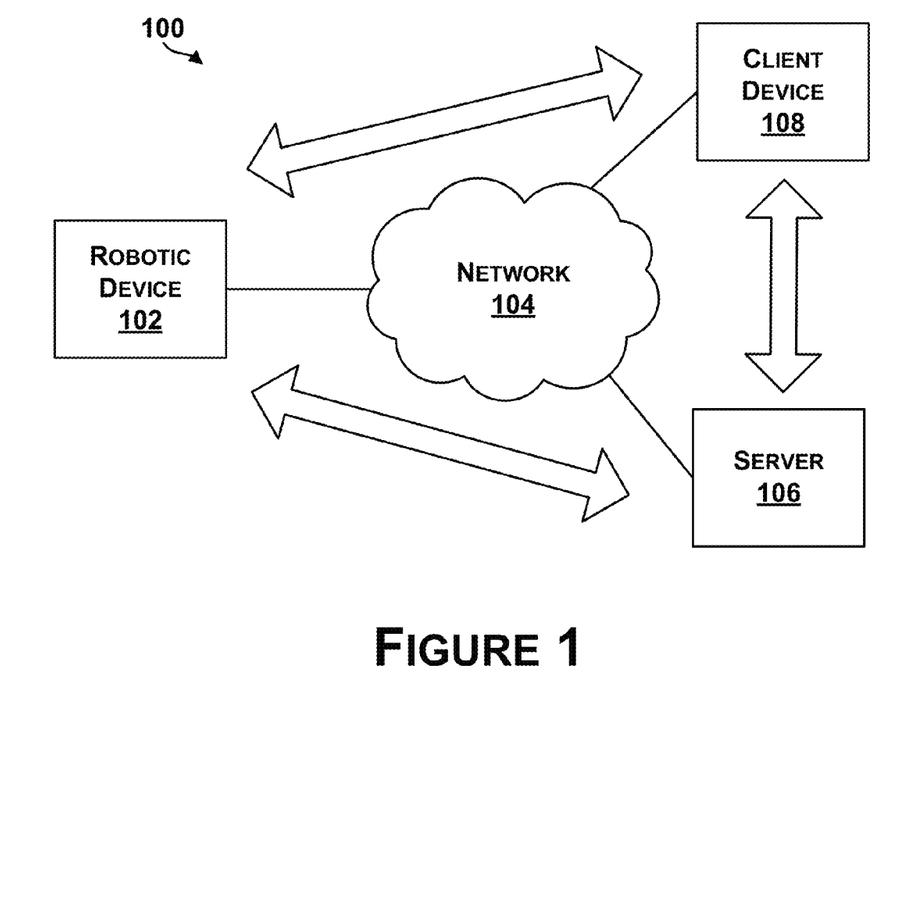
FIG. 1 illustrates an example system for providing feedback on an interface controlling a robotic device.

Referring now to the figures, FIG. 1 is an example system 100 for controlling a robotic device. The system 100 includes a robotic device 102 coupled to a network 104, and a server 106 and a client device 108 also coupled to the network 104. The robotic device 102 may further be coupled directly (or indirectly) to the server 106 and the client device 108 as shown. The system 100 may include more of fewer components, and each of the robotic device 102, the server 106, and the client device 108 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1.

The system 100 may enable cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example. Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

The system 100 includes a number of devices coupled to or configured to be capable of communicating with the network 104. Of course, more or fewer client devices may be coupled to the network 104. In addition, different types of devices may be coupled to the network 104. For example, any of the devices may generally comprise a display system, memory, and a processor.

Any of the devices shown in FIG. 1 may be coupled to the network 104 or to each other using wired or wireless communications. For example, communication links between the network 104 and devices may include wired connections, such as a serial or parallel bus. Communication links may also be wireless links, which may include BLUETOOTH, IEEE 802.11 (IEEE 802.11 may refer to IEEE 802.11-2007, IEEE 802.11n-2009, or any other IEEE 802.11 revision), or other wireless based communication links. In other examples, the system 100 may include access points through which the devices may communicate with the network 104. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the robotic device 102, the server 106, and the client device 108 may include a wired or wireless network interface through which the devices can connect to the network 104 (or access points). As an example, the devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

The network 104 may represent a networked computer architecture, and in one example, the network 104 represents a queue for handling requests from client devices. The network 104 may further include any of a local area network (LAN), wide area network (WAN), wireless network (Wi-Fi), or Internet, for example.

The server 106 may be a component coupled to the network 104 (as shown), or a component of the network 106 depending on a configuration of the system 100. The server 106 may include a processor and memory including instructions executable by the processor to perform functions as described herein.

The client device 108 may include any type of computing device (e.g., PC, laptop computer, tablet computer, etc.), or any type of mobile computing device (e.g., laptop, mobile telephone, cellular telephone, tablet computer, etc.). The client device 108 may include a processor and memory including instructions executable by the processor to perform functions as described herein.

The robotic device 102 may comprise any computing device that may include connection abilities to the network 104 and that has an actuation capability (e.g., electromechanical capabilities). A robotic device may further be a combination of computing devices. In some examples, the robotic device 102 may collect data and upload the data to the network 104. The network 104 may be configured to perform calculations or analysis on the data and return processed data to the robotic device 102.

Any of the client devices may include additional components. For example, the robotic device 102 may include one or more sensors, such as a gyroscope, an accelerometer, or distance sensors to measure movement of the robotic device 102. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the robotic device 102, the server 106, and the client device 108 may include an integrated user-interface (UI) that allows a user to interact with the device. For example, the robotic device 102 may include various buttons and/or a touchscreen interface that allow a user to provide input. As another example, the robotic device 102 may include a microphone configured to receive voice commands from a user. Furthermore, the robotic device 102 may include one or more interfaces that allow various types of user-interface devices to be connected to the robotic device 102.

Figure 2A:
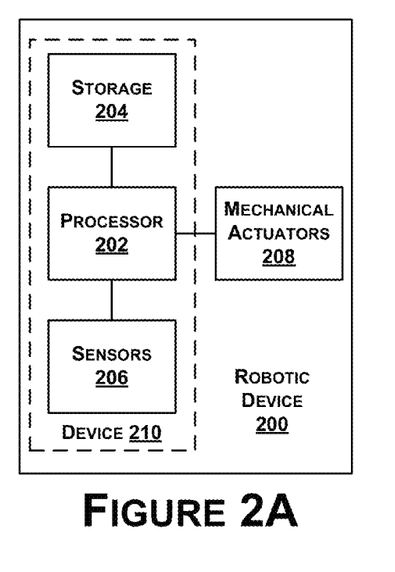
FIGS. 2A-2C are example illustrations of robotic devices.

FIG. 2A illustrates an example robotic device 200. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, BLUETOOTH, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be configured to receive a device, such as device 210, that includes the processor 202, the storage 204, and the sensors 206. For example, the robotic device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud. When the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

Figure 2B:
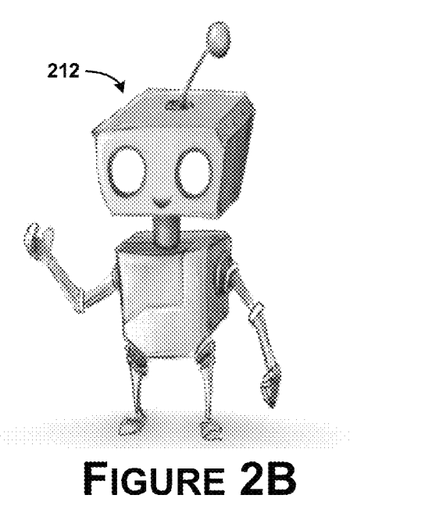

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting the device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

Figure 2C:
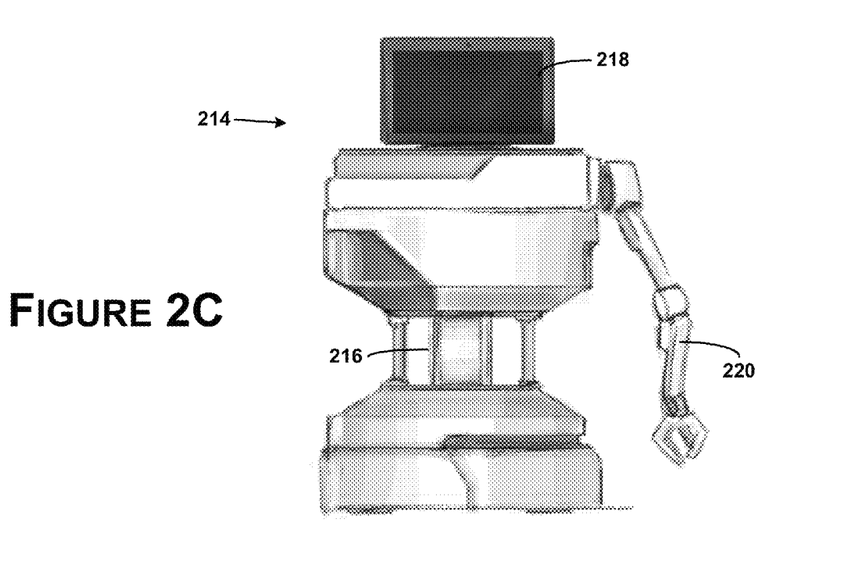

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Any of the robots illustrated in FIGS. 2A-2C may be configured to operate according to example methods described herein, or according to instructions received from devices that may be configured to operate according to example methods described herein.

Figure 3:
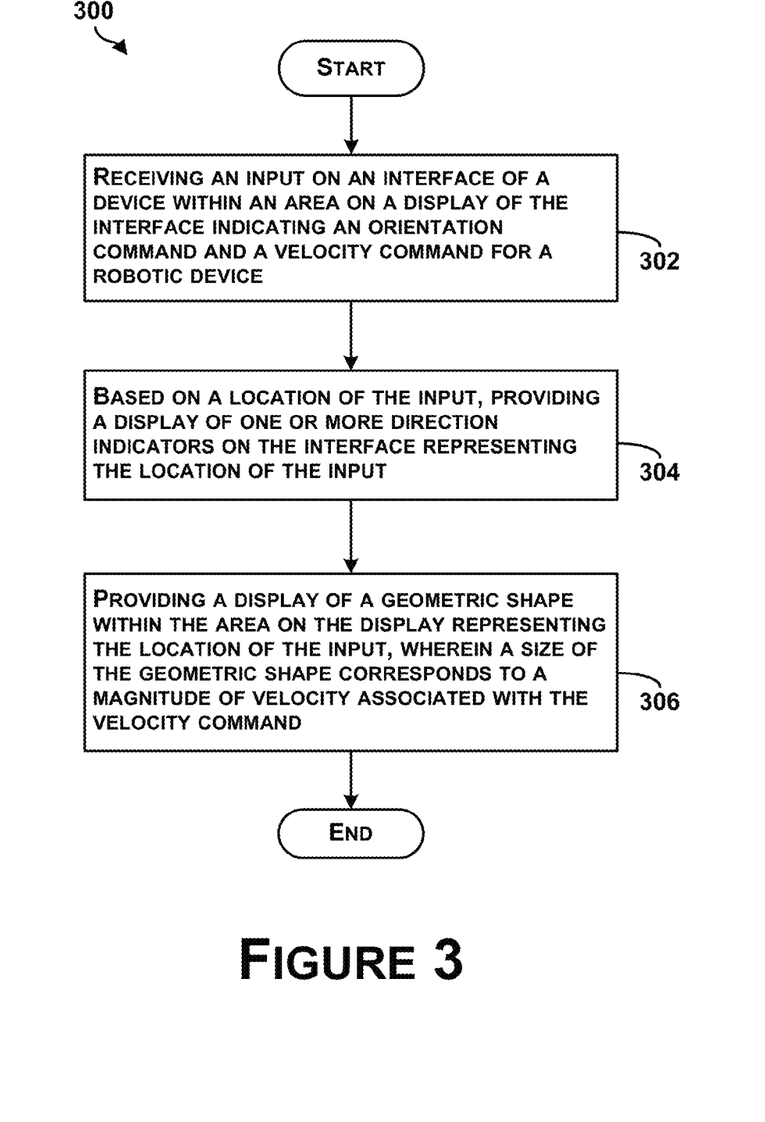
FIG. 3 is a block diagram of an example method of providing feedback on an interface controlling a robotic device, in accordance with at least some embodiments described herein.

FIG. 3 is a block diagram of an example method 300 of providing feedback on an interface controlling a robotic device. Method 300 shown in FIG. 3 presents an embodiment of a method that could be used with the system 100, for example, and may be performed by a device, such as any devices illustrated in FIGS. 1-2, or components of the device. Method 300 may include one or more operations, functions, or actions as illustrated by one or more of blocks 302-306.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving an input on an interface of a device within an area on a display of the interface indicating an orientation command and a velocity command for a robotic device. In some examples, the interface is provided on a device that is remote from the robotic device and the device may be operated to control the robotic device from a remote location. For example, the device may be any type of computing device (e.g., PC, laptop computer, tablet computer, etc.), or any type of mobile computing device (e.g., laptop, mobile telephone, cellular telephone, tablet computer, etc.). Thus, the interface may take the form of an interface enabling a user to remote control the robotic device using the device.

In one example, the interface may be provided on a touchscreen display of a device configured to display the interface, and the device may receive an input to the interface via a touch/contact to the touchscreen by a user or stylus. In some examples, the interface may be configured to associate the touch/contact with the orientation command and the velocity command. For example, contact with a location of the touchscreen may correspond to a velocity command and an orientation command based on the location of the contact with respect to the interface for receiving inputs. A distance from of a location of the input to a reference point on the interface may represent information associated with the velocity command (e.g., a magnitude of velocity), while an orientation of the location of the input with respect to a coordinate system of the interface may represent information associated with the orientation command. In some examples, the velocity command and the orientation command may represent commands for a speed and a directional orientation of the robotic device. In some examples, the user may contact the touchscreen at a first location with a finger or stylus, and slide or move the finger or stylus around the interface to control movement of the robotic device.

As another example, the interface may include a graphical user interface (GUI) of a device, and the device may receive an input to the interface via an input to a keyboard or mouse coupled to the device. As still another example, the interface may be a general interface to a device, and the device may receive an input via receiving a signal (via a wireless or wired connection) to the interface (e.g., which may take the form of a receiver, a port, etc.).

In other examples, the input may be received at a device without using a GUI or touchscreen interface. For instance, a device may receive a signal including information indicating the input. Thus, a device configured to control the robotic device may receive a signal from any number of other devices indicating the input.

The robotic device may include any type of robotic device, including robotic devices that may be configured to turn in place or not, robotic devices that may be stationary or mobile, or have other functionality or limitations, for example.

At block 304, the method 300 includes, based on a location of the input, providing a display of one or more direction indicators on the interface representing the location of the input. A location of the one or more direction indicators on the interface may represent a direction associated with the orientation command. For example, substantially adjacent a perimeter of the area on the display, a plurality of direction indicators may be provided. An intensity or brightness of each of the plurality of direction indicators may be proportional to an alignment with or proximity to an orientation of the location of the input with respect to a coordinate system of the area on the display.

In one example, the area on the display may be a circle such that a circumference of the circle constitutes a perimeter of the area. The circle may include a frame of reference such that a top indicates a forward movement of the robotic device, a bottom indicates a reverse movement of the robotic device, and a left/right indicate a left/right movement of the robotic device. One or more direction indicators, such as lines, shapes, or icons normal to the circumference of the circle may be provided based on a location of the input. When the orientation of the location of the input indicates a forward movement, the display of the one or more direction indicators may be provided at the top of the circle, for example.

In some examples, the location and/or brightness of the one or more direction indicators may vary as the location of the input varies. In an instance in which the interface is a display provided on a touchscreen, the display of the one or more direction indicators may be provided such that the one or more direction indicators are visible while receiving the input. Providing the display of the one or more direction indicators substantially adjacent the area of the display may afford visual feedback relating to an orientation of the location of the input while, for example, a user provides the input. In one example, an occlusion of the location of the input due to a finger or stylus contacting the touchscreen may prevent the user from viewing the location of the input directly.

In still other examples, in instances in which the input is not provided on a touchscreen interface, the display of one or more direction indicators on the interface may not be associated with any location of the input. Rather, a location of the one or more direction indicators on the interface may represent a direction associated with the orientation command of the input, for example.

At block 306, the method 300 includes providing a display of a geometric shape within the area on the display, representing the location of the input. A size of the geometric shape may correspond to a magnitude of velocity associated with the velocity command. As one example, the interface may include a circle concentric with the area on the display. A location of the input may be substantially adjacent a circumference of the circle, such that a distance from the location of the input to a center of the area on the display (i.e., a radius of the circle) may represent a magnitude of velocity associated with the velocity command.

In some examples, the location and/or size of the geometric shape may vary based on the location of the input. In an instance in which the interface is a display provided on a touchscreen, the display of the geometric shape may be provided such that the geometric shape is visible while receiving the input. Providing the display of the geometric shape such that a location of the input is substantially adjacent a perimeter of the geometric shape may afford visual feedback relating to the location of the input while, for example, a user provides the input. In one example, an occlusion of the location of the input due to a finger or stylus contacting the touchscreen may prevent the user from viewing the location of the input directly, but a visible portion of the geometric shape may provide information related to the velocity command.

In still other examples, in instances in which the input is not provided on a touchscreen interface, the display of the geometric shape on the interface may not be associated with any location of the input. Rather, a size of the geometric shape may correspond to a magnitude of velocity associated with the velocity command of the input, for example.

In a further example, a display of a second geometric shape (e.g., a circle) may be provided within the area of the display. A perimeter of the second geometric shape may represent locations on the interface configured to receive an input indicating a maximum magnitude of velocity for the robotic device. The size of the geometric shape with respect to the size of the second geometric shape may indicate a relative value of the magnitude of velocity.

For example, the interface may include two concentric circles, a maximum magnitude circle with a fixed size, and a current magnitude circle with a size based on a location of the received input. Receiving an input at a location halfway between a circumference of the maximum magnitude circle and a center of the two circles may result in a display of the current magnitude circle provided such that a size of the current magnitude circle is half the size of the maximum magnitude circle. The relationship between the size of the current magnitude circle and the size of the maximum magnitude circle may convey information associated with an input indicative of a 50% velocity relative to the maximum velocity for controlling the robotic device according to a configuration of the interface. Thus, a user may gauge and select a desired relative speed based on the size of the current magnitude circle with respect to the circumference of the maximum magnitude circle.

According to the method 300, a display of an indicator may be generated on the interface and provided at the location of the input. In some examples, the display of the indicator may be substantially adjacent a perimeter of the geometric shape. In one instance the geometric shape may be concentric with the area on the display of the interface. As a location of the input may vary, the location of the indicator, and thus the size of the geometric shape, may vary. Hence, regardless of the location of the input and whether the display of the indicator is visible due to an occlusion (e.g., a user's finger contacting the interface), feedback about a magnitude of velocity may be provided via the size of the geometric shape.

In one example, the method 300 may include modifying a portion of the geometric shape based on the location of the input. In an instance in which the interface is a touchscreen, an occlusion due to a user's finger contacting the touchscreen, for example, may prevent the user from viewing the one or more direction indicators. The modified portion of the geometric shape may be located opposite the location of the one or more direction indicators, providing visual feedback representing the direction associated with the orientation command in an inverse manner. In one example, the geometric shape may be a circle concentric with the area on the display. The circle may have a transparent or partially transparent circular sector, which for example, may appear conceptually as a circle that has an arc missing. The transparent circular sector may be located opposite the direction associated with the orientation command. In some instances, while the one or more direction indicators may be occluded, a user may still determine the direction associated with the orientation command based on the location of the modified portion of the geometric shape.

In other examples, the portion of the geometric shape may be modified in other manners, such that a portion of the geometric shape appears visibly distinct as compared to a remainder of the geometric shape.

In another example, the method 300 may include providing a display of a numerical value associated with the magnitude of velocity on the interface. For example, the numerical value may be a relative magnitude of velocity such as a percentage of velocity with respect to a maximum magnitude of velocity for controlling the robotic device according to a current configuration of the interface. In some examples, the numerical value may be provided within the modified portion of the geometric shape as a percentage of a maximum possible speed.

In yet another example, the method 300 may include generating a control signal indicating the velocity command and the direction command, and providing the control signal to the robotic device. The control signal may be generated according to a variety of methods and forms, where a particular method and form are determined based on a configuration of the robotic device for receiving velocity and directional orientation information for the robotic device. In one example, a combination of a display of the geometric shape, the one or more direction indicators, and/or the modified portion of the geometric shape may provide visual feedback about the direction command and the velocity command provided to the robotic device via the control signal while the input is received on the interface. According to the method 300, the visual feedback may be provided in a manner that is visible on the interface to a user regardless of an occlusion preventing the user from viewing a portion of the interface. In some examples, the user may quickly discern a magnitude of velocity and/or direction associated with a location of an input based on the visual feedback.

Figure 4A:
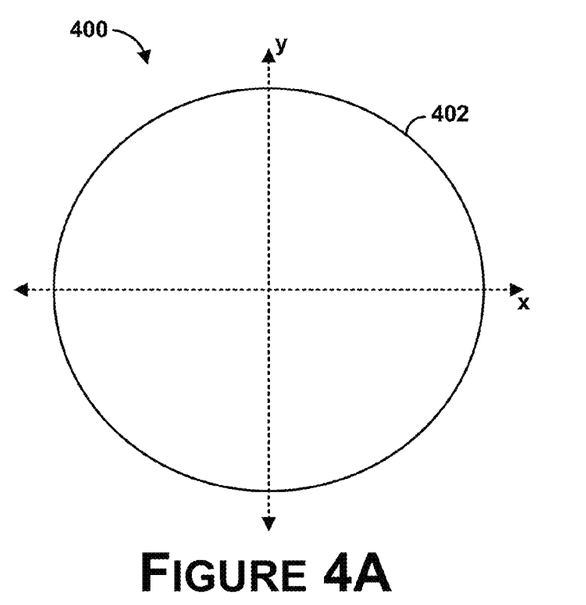
FIGS. 4A-4B are example conceptual illustrations of an interface for providing feedback.
Figure 4B:
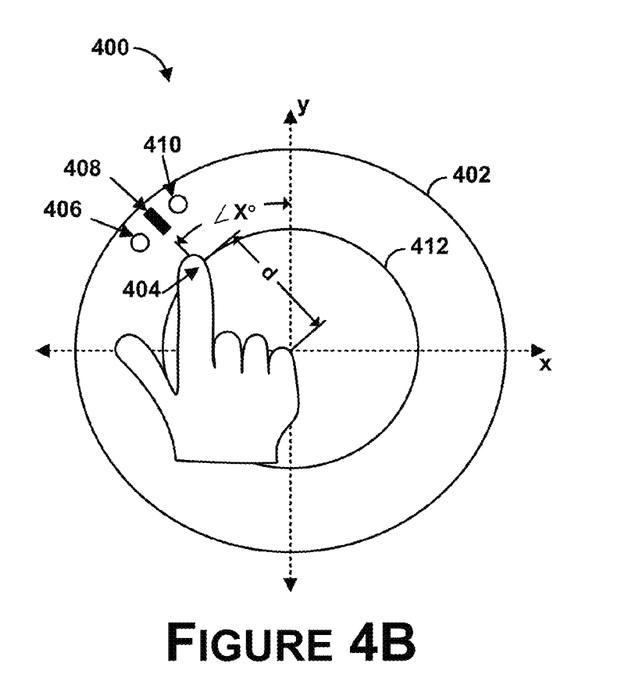

FIGS. 4A-4B are example conceptual illustrations of on an interface 400 for providing feedback. The interface 400 may be provided on a display of a touchscreen, and may be configured to receive inputs and correlate the inputs to commands for velocity and directional orientation of a robotic device remote from the touchscreen. The interface 400 may be configured to provide feedback about a velocity command and an orientation command generated for controlling the robotic device while the inputs are received. For example, the interface 400 may provide feedback about a magnitude of velocity associated with the velocity command and/or a direction associated with the orientation command while a user's finger or stylus may occlude from the user a location on the interface 400 beneath, around, or near a contact with the interface 400 by the user.

As shown in FIG. 4A, the interface 400 includes a circular area 402 of the display that may be representative of a range of velocity and a range of directional orientation of the robotic device. The circular area 402 may be an area on the interface 400 configured to receive inputs for controlling the robotic device. In one example, the touchscreen may comprise a graphical user interface operable to receive an input and determine information associated with an absolute position of the input with respect to a coordinate system of the graphical user interface. For example, a velocity command and/or a direction command may be associated with the input based on the absolute position.

As shown in FIG. 4B, the interface may receive an input from a user's finger or from a stylus at a location 404. In one example, an angle "x°" with respect to the location 404 and a coordinate system of the interface may represent information associated with a direction command. For example, in a configuration where the interface is oriented such that an input on a positive y-axis or top of the circle 402 is associated with movement of the robotic device straight forward, an input received at the location 404 may be indicative of a directional orientation input causing the robotic device to attempt to turn in a direction "x°" to the left. The interface may be configured to provide, in one example, direction indicators 406, 408, and 410 adjacent a circumference of the circular area 402 based on the location of the input. In one example, as the location 404 varies, the location of the direction indicators 406, 408, and 410 may also vary, such that the location of the direction indicators 406, 408, and 410 represents the direction associated with an orientation command for controlling the robotic device based on the location of a received input.

In another example, a distance "d" from the location 404 to a center of the circular area 402 may represent information associated with a velocity command. For example, a direct relationship between a ratio of a distance "d" and a radius of the circular area 402 may correspond to a relative magnitude of velocity associated with a velocity command for controlling the robotic device (e.g., when "d" is half of the radius the ratio may be 1:2 or one half, and the velocity command may be indicative of a movement at 50% of the maximum controllable speed of the robotic device). In some examples, a display of a circle 412, concentric with the circular area 402, may be provided. A circumference of the circle may be substantially adjacent the location 404, such that the distance "d" corresponds to a radius of the circle 412. Thus, the size of the circle 412 may also correspond to the magnitude of velocity associated with the velocity command, and vary as the location of the input may vary.

Figure 5A:
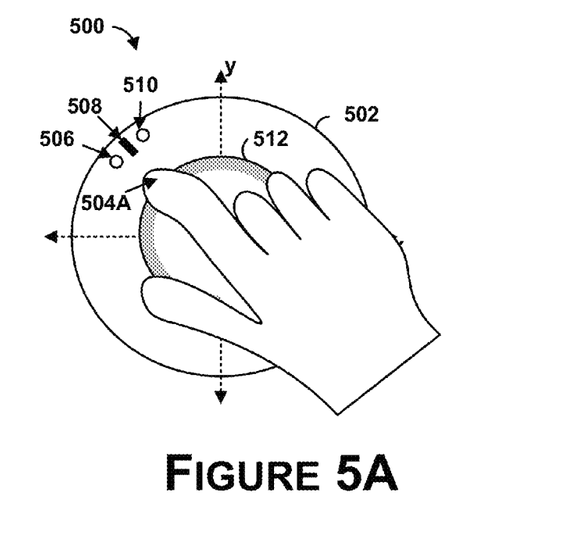
FIGS. 5A-5B illustrate another example of an interface.
Figure 5B:
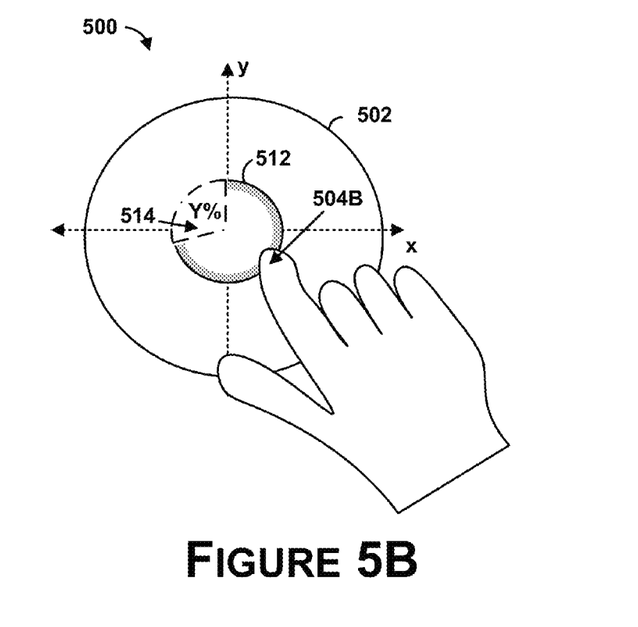

FIGS. 5A-5B illustrate another example of an interface 500. The interface 500 may be provided on a display of a touchscreen, and provide feedback about a velocity command and an orientation command generated for controlling a robotic device while inputs are received within a circular area 502. As shown in FIG. 5A, an input may be received via contact of the touchscreen at location 504A. Direction indicators 506, 508, and 510, and a speed circle 512, concentric with the circular area 502, may be provided on the interface 500.

In one example, the speed circle 512 may also include a modified portion (see 514 of FIG. 5B) occluded by the contact of the touchscreen. Although a user may be occluded from viewing the modified portion of the speed circle 512 in FIG. 5A, the direction indicators 506, 508, and 510 may provide visible feedback about a direction associated with the orientation command. Similarly, although the user may be occluded from viewing a numerical value provided within the modified portion representing a percentage of velocity (see "Y %" in FIG. 5B), the size of the speed circle 512 may be proportional to and provide visual feedback about a magnitude of velocity associated with the velocity command. For example, a circumference of the circular area 502 may represent locations on the interface configured to receive an input indicating a maximum magnitude of velocity (i.e., 100%). Based on a relationship between the size of the speed circle 512 and a size of the circular area 502 as shown, the magnitude of velocity may be determined to be about 55%.

As shown in FIG. 5B, an input may be received via contact of the touchscreen at a location 504B. Although a display of the direction indicators 506, 508, and 510 may be occluded from view and not visible to the user, the user may be able to determine a direction associated with an orientation command based on a location of a modified portion 514. The location of the modified portion 514 may represent the direction associated with the orientation command in an inverse manner. For example, the location of the modified portion 514 may be located opposite the location of the direction indicators 506, 508, and 510 and located on an opposite side of the speed circle 512 as the location 504B.

Figure 6A:
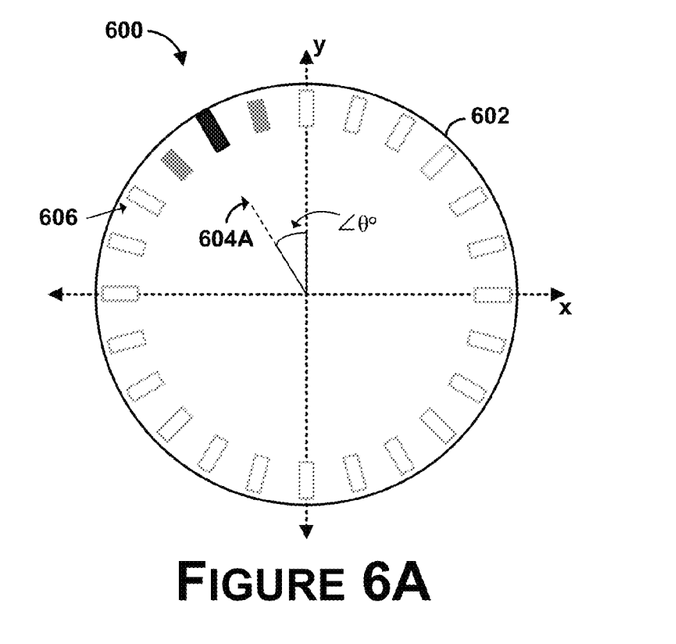
FIGS. 6A-6B are example conceptual illustrations of representing a direction associated with an orientation command.
Figure 6B:
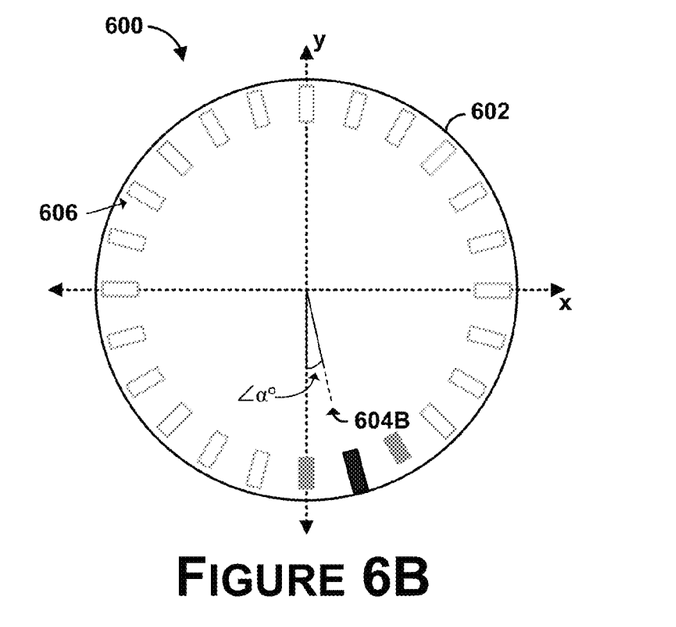

FIGS. 6A-6B are example conceptual illustrations of representing a direction associated with an orientation command. An interface 600 may include a circular area 602. The interface 600 may be configured such that inputs may be received at a location within the circular area 602 with respect to a two-dimensional coordinate system (i.e., x-y axis). For example, an input may be received at an angle about between 0° and about 360°, where a top of the circular area 602 is 0°, a right is 90°, a bottom is 180°, and a left is 270°. The interface 600 may further include 24 direction indicators 606 equally spaced at about 15° intervals around a circumference of the circular area 602. In one example, locations of the direction indicators may be fixed at 0°, 15°, 30°, . . . 330°. Transparency values of the direction indicators 606 may vary (e.g., vary within a range of visible to opaque) based on an orientation of a received input or distances from the location of the input to locations of the direction indicators 606.

For example, five direction indicators 606 closest to an orientation of an input may be visible, while the remaining nineteen direction indicators 606 may be opaque. A single direction indicator 606 of the five most closely aligned with the orientation may be the most visible or brightest in intensity, while the transparency of the other four visible direction indicators 606 may vary proportionally based on a proximity to the orientation of the input. However, other configurations, including more or less direction indicators 606 for example, are also possible.

As shown in FIG. 6A, in one example, an input may be received at a location 604A, at about 330°. In a configuration in which three direction indicators 606 closet to an input are displayed, direction indicators 606 located at 315°, 330°, and 345° may be opaque, with the direction indicator 606 at 330° the least transparent, while all other direction indicators 606 may be transparent or partially transparent.

As shown in FIG. 6B, in one example, an input may be received at location 604B, at about 170°. In a configuration in which three direction indicators 606 are displayed, direction indicators 606 located at 150°, 165°, and 180° may be opaque, with the direction indicator 606 at 165° the brightest, while the remaining direction indicators 606 may be transparent or partially transparent.

Figure 7A:
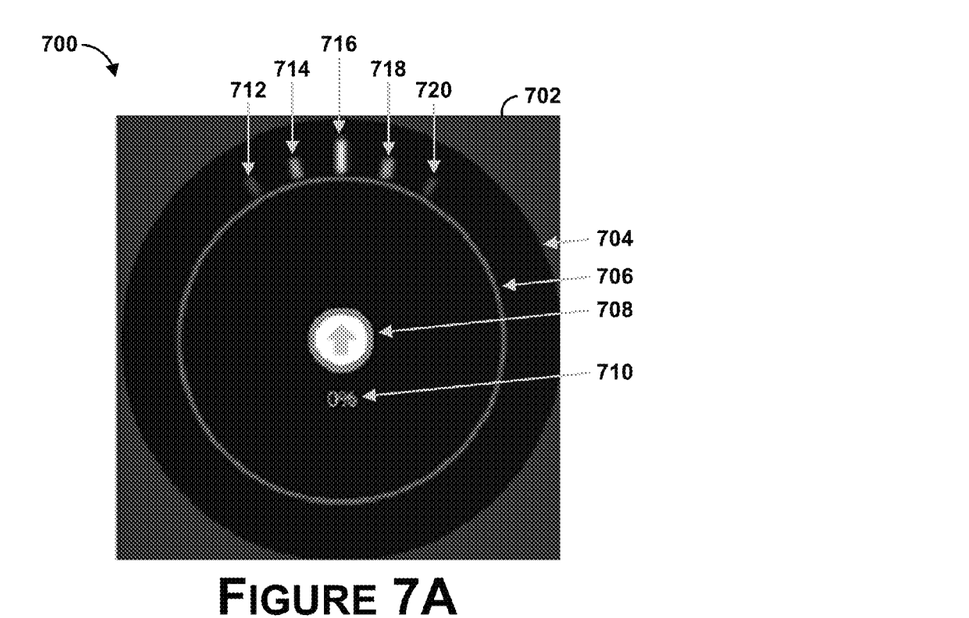
FIGS. 7A-7C illustrate still another example interface.
Figure 7B:
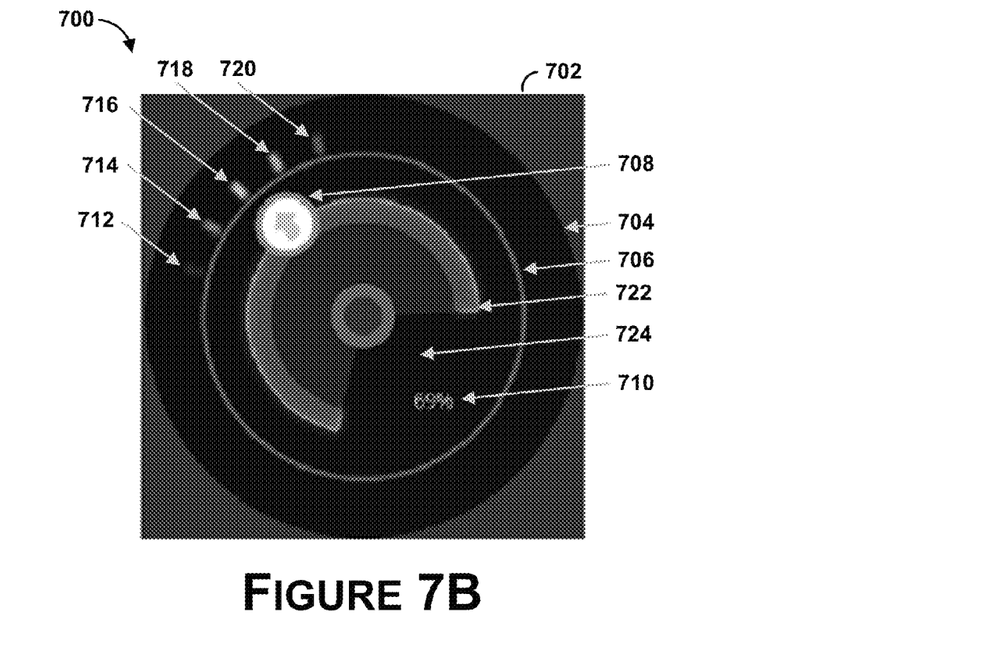
Figure 7C:
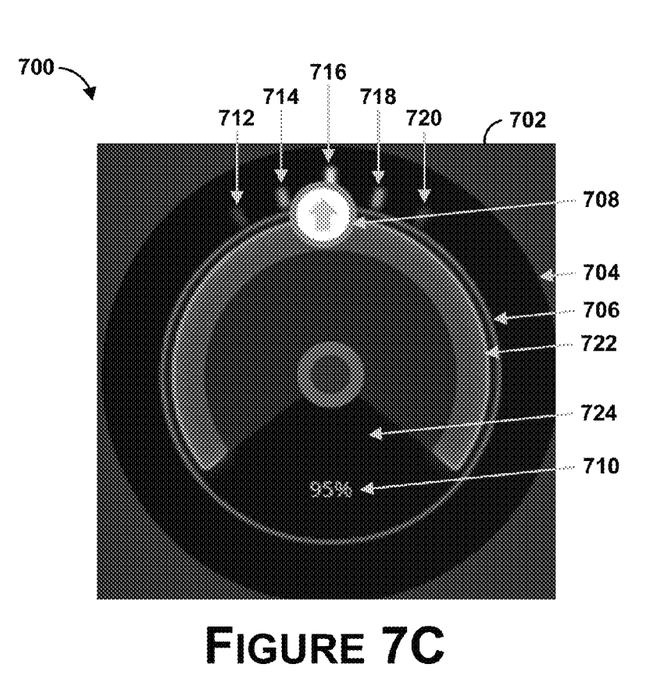

FIGS. 7A-7C illustrate still another example interface 700. The interface 700 may be provided on a display 702 of a touchscreen. The interface may be a circle 704 and include a maximum magnitude circle 706 concentric with the circle 704. Inputs to the interface 700 may be received within an area of the maximum magnitude circle 706, for example. An indicator 708 may be provided at a location of an input to the interface 700. The interface 700 may also include a relative magnitude value 710 indicating a magnitude of velocity associated with the input relative to a maximum possible velocity. The interface 700 may also include direction indicators 712, 714, 716, 718, and 720 (712-720) provided at a location representing the location of the input.

As shown in FIG. 7A, the interface 700 is in a default position where a user is not interacting with the interface 700. Thus, the indicator 708 is located in a center position and the relative magnitude value 710 is 0%.

As shown in FIG. 7B, the interface 700 shows an input received corresponding to controlling a robot at 69% of the maximum possible velocity while also indicating to turn left. Thus, the indicator 708 is located in an upper-left quadrant of the circle 706. The interface 700 also includes a magnitude circle 722 indicating a current velocity as the relative magnitude value 710 of the maximum possible velocity. The relative magnitude value 710 may be a percentage (i.e., 69%) displayed within a cut-out arc 724 of the magnitude circle 722. The direction indicators 712-720 are visible near an upper left portion of a circumference of the maximum magnitude circle 706, and the cut-out arc 724 is a lower right portion of the magnitude circle 722.

As shown in FIG. 7C, the interface 700 shows an input received corresponding to controlling a robot at 95% of the maximum possible velocity while also indicating to move in a forward direction. Thus, the indicator 708 is located near the top of the circle 706. The magnitude circle 722 is about 95% of the size of the maximum magnitude circle 706, and the relative magnitude value 710 (i.e., 95%) is displayed within the cut-out arc 724. Also, the direction indicators 712-720 are visible above a top portion of a circumference of the maximum magnitude circle 706, and the cut-out arc 724 is a bottom portion of the magnitude circle 722, opposite the location of the direction indicators 712-720.

In examples herein, interfaces are provided that may be configured to both receive inputs as well as provide outputs (e.g., touchscreen displays). For instance, an interface may be provided on a handheld computer that can receive an input and provide a display representative of the output.

In other examples, interfaces may be provided that are configured to receive inputs, and outputs may be provided by other devices. For instance, a motion-detection device may be configured to receive an input and to provide the input to a display device which displays an output representative of the input. The motion-detection device may include a camera, a depth sensor, microphones, etc., and may be configured to provide motion capture, facial recognition, and voice recognition capabilities. The depth sensor may be configured to include an infrared laser projector and a monochrome CMOS sensor that can capture video data in 3D under ambient light conditions. The motion-detection device may be configured to provide an interface using the infrared laser projector, for example, to receive inputs from users. The inputs can be associated with indicating an orientation command and a velocity command for a robotic device that is remote from the motion-detection device. The interface may be viewable by a user, such as a laser projected interface, or may be a conceptual interface in which inputs are received due to motion of the user and the interface is not visible to the user.

The motion-detection device may be coupled to a display device, and may provide outputs to the display device. The motion-detection device may generate a display representative of the interface or representative of inputs to the interface, and provide the display to the display device (or may provide information associated with the inputs to the display device and the display device can generate the display). The display may include an indicator representing a location of a received input, and the indicator may be representative of the command for the orientation of the camera on the robotic device. The location of the received input can be associated with a physical or geographic location, or can be associated with a location on the display representative of the interface that maps to the location of the received input. For instance, a user may provide an input to the interface provided by the motion-detection device at a physical location, and the physical location can be mapped to a position on a display representative of the interface.

The motion-detection device or the display device may further be configured to provide a display of one or more direction indicators on an interface, and a location of the one or more direction indicators on the interface may represent a direction associated with the orientation command.

The motion-detection device or the display device may be further configured to provide a display of a geometric shape on the interface, and a size of the geometric shape corresponds to a magnitude of velocity associated with the velocity command.

Thus, in some examples, a first device may be configured to receive an input at an interface that may be provided by or on the first device, and a second device different from the first device may be configured to provide an output based on the input. As a specific example, a motion-detection device may receive an input, and an output can be provided on a display device coupled (either wired or wirelessly) to the motion-detection device. As another example, a user may provide an input on a device (e.g., a keyboard, mobile phone, computing device, etc.) that is coupled to a separate device (e.g., a display) on which an output is provided.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
providing a display of an interface including: a first geometric shape having a first size at a center point that represents a frame of reference of a robotic device; and an indication of a direction in which the robotic device is orientated;
receiving, at a point within an area of the first geometric shape, an input indicating an orientation command and a velocity command for the robotic device, wherein the point is located at a particular distance from the center point of the first geometric shape and at a particular angle from the indication of the direction in which the robotic device is oriented;
in response to the input:
providing a display of one or more direction indicators on the interface, wherein at least one direction indicator is located at a point that is at the particular angle from the indication of the direction in which the robotic device is oriented, and wherein the at least one direction indicator indicates the orientation command; and
providing a display of a second geometric shape on the interface within the area of the first geometric shape, wherein the second geometric shape has a second size that is proportional to the particular distance; and wherein a ratio of the second size to the first size indicates the velocity command.

2. The method of claim 1, further comprising:
based on the point of the input, providing a display of one or more direction indicators on the interface representing the point of the input.

3. The method of claim 2, wherein a location of the one or more direction indicators representing the point of the input is adjacent a perimeter of the area of the first geometric shape.

4. The method of claim 2, wherein the display of the one or more direction indicators comprises a fixed number of direction indicators provided at fixed positions adjacent to a perimeter of the area of the first geometric shape, wherein transparency values associated with the fixed number of direction indicators vary based on distances from the location of the input to locations of the fixed number of direction indicators.

5. The method of claim 1, wherein an orientation of the point of the input with respect to a coordinate system of the interface on the display represents information associated with the orientation command.

6. The method of claim 1, wherein receiving the input at the point within the area of the first geometric shape comprises receiving a contact on a touchscreen of a computing device, wherein the touchscreen is configured to display the interface.

7. The method of claim 6, wherein the display of the second geometric shape is provided such that the second geometric shape is visible while receiving the input.

8. The method of claim 6, wherein the display of the one or more direction indicators is provided such that the one or more direction indicators are visible while receiving the input.

9. The method of claim 1, wherein the second geometric shape is concentric with the first geometric shape.

10. The method of claim 9, wherein a perimeter of the second geometric shape is adjacent the point of the input.

11. The method of claim 1, further comprising:
providing a display of an indicator on the interface at the point within the area of the first geometric shape representing the point of the input.

12. The method of claim 11, wherein the display of the indicator is adjacent a perimeter of the second geometric shape.

13. The method of claim 1, further comprising providing a modified portion of the second geometric shape opposite the point of the at least one direction indicator, wherein the modified portion provides a display representing the particular angle in an inverse manner.

14. The method of claim 13, wherein the second geometric shape is a circle, and wherein the modified portion of the second geometric shape is a circular sector.

15. The method of claim 13, wherein the modified portion of the second geometric shape is transparent.

16. The method of claim 1, further comprising:
providing a display of a numerical value associated with a magnitude of the velocity command on the interface.

17. The method of claim 16, further comprising providing a modified portion of the geometric shape opposite the point of the at least one direction indicator, wherein the modified portion provides a display representing the particular angle in an inverse manner, and wherein the display of the numerical value is provided within the modified portion of the geometric shape.

18. The method of claim 1,
wherein a perimeter of the first geometric shape represents locations on the interface configured to receive an input indicating a maximum magnitude of velocity for the robotic device.

19. A non-transitory computer readable medium having stored therein instructions executable by a computing device to cause the computing device to perform functions of:
providing a display of an interface including: a first geometric shape having a first size at a center point that represents a frame of reference of a robotic device; and an indication of a direction in which the robotic device is orientated;
receiving, at a point within an area of the first geometric shape, an input indicating an orientation command and a velocity command for the robotic device, wherein the point is located at a particular distance from the center point of the first geometric shape and at a particular angle from the indication of the direction in which the robotic device is oriented;
in response to the input:
providing a display of one or more direction indicators on the interface, wherein at least one direction indicator is located at a point that is at the particular angle from the indication of the direction in which the robotic device is oriented, and wherein the at least one direction indicator indicates the orientation command; and
providing a display of a second geometric shape on the interface within the area of the first geometric shape, wherein the second geometric shape has a second size that is proportional to the particular distance; and wherein a ratio of the second size to the first size indicates the velocity command.

20. The non-transitory computer readable medium of claim 19, wherein the second geometric shape is a circle concentric with an area of a display of a device that is configured to provide the interface.

21. A device comprising:
a processor; and
memory including instructions stored therein executable by the processor to perform functions comprising:
providing a display of an interface including: a first geometric shape having a first size at a center point that represents a frame of reference of a robotic device; and an indication of a direction in which the robotic device is orientated;
receiving, at a point within an area of the first geometric shape, an input indicating an orientation command and a velocity command for the robotic device, wherein the point is located at a particular distance from the center point of the first geometric shape and at a particular angle from the indication of the direction in which the robotic device is oriented;
in response to the input:
providing a display of one or more direction indicators on the interface, wherein at least one direction indicator is located at a point that is at the particular angle from the indication of the direction in which the robotic device is oriented, and wherein the at least one direction indicator indicates the orientation command; and
providing a display of a second geometric shape on the interface within the area of the first geometric shape, wherein the second geometric shape has a second size that is proportional to the particular distance; and wherein a ratio of the second size to the first size indicates the velocity command.

22. The device of claim 21, further comprising instructions executable by the processor to perform a function comprising providing a modified portion of the second geometric shape opposite the point of the at least one direction indicator representing the particular angle in an inverse manner.

* * * * *